A. BARKER.
Car-Brake.
No. 162,340. Patented April 20, 1875.
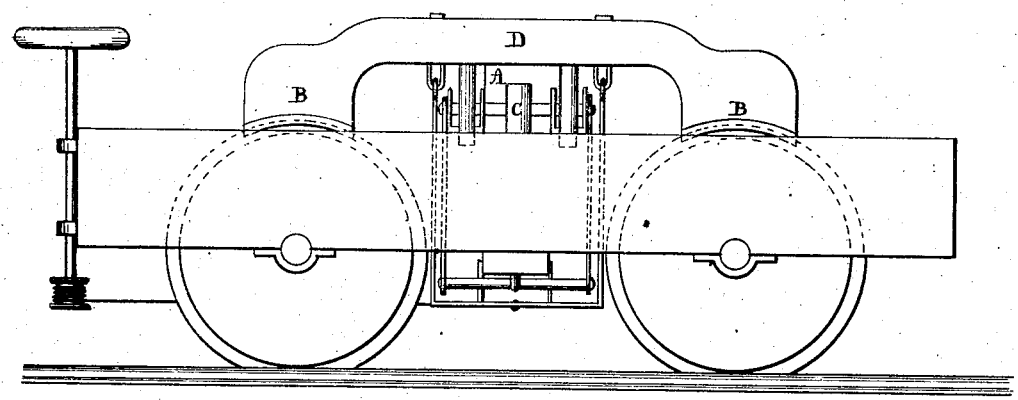
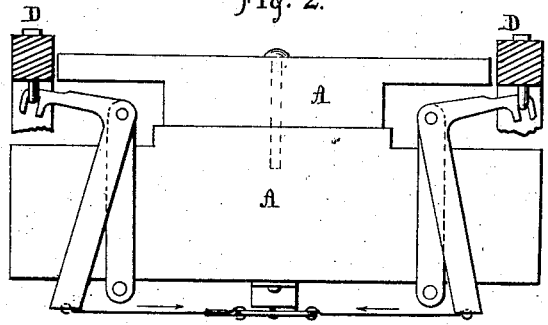
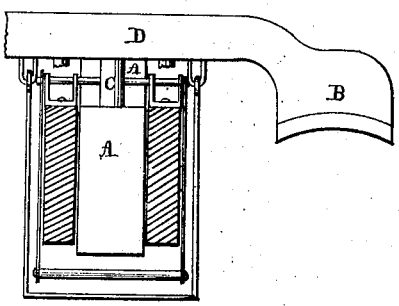
WITNESSES:
B. M. Owen
G. E. Palmer
INVENTOR.
Abel Barker

UNITED STATES PATENT OFFICE.

ABEL BARKER, OF WYOMING, PENNSYLVANIA.

IMPROVEMENT IN CAR-BRAKES.

Specification forming part of Letters Patent No. 162,340, dated April 20, 1875; application filed January 27, 1875.

*To all whom it may concern:*

Be it known that I, ABEL BARKER, of Wyoming, in the county of Luzerne and State of Pennsylvania, have invented a new and useful Improvement in Brakes for Railroad-Cars, the object of which is to prevent the sliding of the car-wheels upon the track, while a pressure nearly equal to the weight of the car and load may be made upon the wheels, bringing it as nearly to a stop as the most efficient resistance would require, the pressure upon the wheel being governed entirely by the load and weight of the car, making it impossible, whatever power may be applied to the brakes, to get quite as much pressure upon the wheels as upon the track, and thereby preventing that fruitful source of injury to the wheels and danger to the cars—flattened surfaces; and I hereby declare the following to be a full, clear, and exact description of the construction and operation of the same, reference being had to the annexed drawings, making a part of this specification, in which—

Figure 1 is an elevation, showing the truck with my improved brake applied on the top of the wheels. Fig. 2 shows the movable or adjustable bolster or bed-piece, on which the body of the car rests, with the brake-levers attached thereto; and Fig. 3 shows the brakes attached to the levers, with the stops on the movable bolster, which impinge upon the brake-bar when the bolster rises, and prevents the putting of a greater pressure of the brakes on the wheels than the weight of the car and load.

In constructing this improvement, I arrange the bed-piece A, or part which furnishes pivotal bearings for the brake-levers, so that it may be raised or lowered a suitable distance to meet the requirements of my improvement. To this I attach the fulcrums of the brake-levers, connecting them therewith in such way that when the pressure of the brakes B B on the wheels is nearly equal to the weight of the car and load the bed-piece A, or part which furnishes pivotal bearings for the brake-levers, will be raised, bringing the stops C C against the brake-bars D D, thereby preventing any further pressure upon the wheels. It is well known that in a train of cars, where the weight of the cars or loads they carry is not equal, the brakes being applied with equal pressure on all, the wheels on the lighter ones will be made to slide, or the full efficiency of the heavier ones will not be obtained, but by my improvement the full pressure of the heavier ones will be secured, while the wheels on the lighter ones will not slide. In fact, the entire weight of the cars and the loads they carry, however distributed, may be utilized to check the motion of the train without danger to the wheels.

This plan is self-adjusting, not only as to different cars of various weights or loads, but also to the same car with more weight on one side or on one truck than on the other.

This arrangement may be so modified as to use the brakes on the sides as well as on the tops of the wheels, and may also be adapted to the trucks now in use, the main feature being the movable bed-piece and fulcrums so as to bring a stop against the brake-bars or other parts, which shall prevent the putting of more than the weight of the car and load, or so much of it as shall be found necessary to give the greatest resistance to the rotatory motion of the wheels, upon them without sliding them.

I do not confine myself to any particular arrangement, form, or kind of levers, eccentrics, wheels, or power to work the brakes, but use the most suitable devices therefor.

This improvement furnishes the great desideratum for the compressed-air and vacuum methods of working car-brakes.

Having thus described my improvement, what I claim as my invention, and desire to secure by Letters Patent, is—

The combination of a car-body, a vertically-movable support therefor, and brakes with connecting mechanism, whereby the pressure of said brakes upon the wheels is regulated by the weight of said car-body, and a correspondence is maintained between such pressure and weight as the latter is increased or diminished, substantially as and for the purpose specified.

ABEL BARKER.

Witnesses:
   B. M. OWEN,
   G. H. PALMER.